Patented Jan. 10, 1950

2,494,083

UNITED STATES PATENT OFFICE 2,494,083

DISUBSTITUTED GLYCYL DERIVATIVES OF AMINO QUINOLINES

William F. Bruce, Upper Darby, Pa., assignor to Wyeth Incorporated, Philadelphia, Pa., a corporation of Delaware No Drawing. Application April 17, 1945,
Serial No. 588,885

1 Claim. (Cl. 260—287)

This invention relates in general to the synthesis of new chemical compounds of the quinoline series, and in particular, relates to the synthesis of quinoline compounds in which a disubstituted glycyl radical (—COCH$_2$NRR') is attached through an amino group or bridge to a carbon atom of an alkoxy substituted quinoline ring. Structurally, such compounds can be represented by the formula QNHCOCH$_2$NRR' wherein Q is an alkoxy substituted quinoline ring and R and R' are hydrocarbon radicals such as alkyl, aryl, aralkyl or cycloalkyl groups, for instance, methyl, ethyl, propyl, butyl, phenyl, benzyl, cyclopentyl and cyclohexyl radicals or NRR' together constitute a heterocyclic ring. R and R' may be similar or dissimilar. These compounds are useful as spasmolytic and local anesthetic agents.

The preferred embodiment of my invention is directed to the synthesis of the more specific group of compounds represented by the generic formula

wherein R, R' and R'' are alkyl, aryl or cycloalkyl radicals which may be similar or dissimilar or wherein

is a heterocyclic ring, such as piperidyl.

In general, the compounds of the invention may be synthesized by treating the appropriate substituted aminoquinoline with a halogenoacetyl halide such as chloracetyl chloride, followed by reacting the resulting product with an appropriate secondary amine.

In order to promote a better understanding of this invention, illustrative specific procedures for the preparation of the compounds falling within the generic formula are given in the following examples.

EXAMPLE I

*Preparation of 6 - methoxy - 8 - (alpha - dibutylaminoacetamido) -quinoline*

60 gms. of 6-methoxy-8-aminoquinoline were dissolved in a liter of ether and cooled in an ice bath at 10° C. To this was added slowly with stirring, a solution of 26 cc. (40 gms.) of chloracetyl chloride dissolved in 250 cc. of ether. Slow addition and cooling was necessary as the reaction was instantaneous and violent. After addition of the chloracetyl chloride and vigorous stirring for some time, the precipitated solid hydrochloride of the reaction product was filtered off, suspended in ether and refiltered. The filtrate was found to contain a small amount of unreacted aminoquinoline. The yield of impure hydrochloride was 95 gms. or 95% of the theoretical. After recrystallization from alcohol, the product melted at 240 to 241° C. The 6-methoxy-8-(alpha - chloracetamido)-quinoline hydrochloride gave the following analysis:

Calculated for: C$_{12}$H$_{11}$N$_2$O$_2$ClHCl ............ 50.2% C    4.18% H
Found ..................................................... 49.8%      4.41%
                                                              50.4%      4.35%

The free base was readily prepared from the hydrochloride by treatment with sodium hydroxide or sodium carbonate and was purified by crystallization from benzene. The purified base had a melting point of 110 to 111° C.

Analysis

Calculated for: C$_{12}$H$_{11}$N$_2$O$_2$Cl ............... 57.54% C    4.4 % H
                                                              14.18%      11.18%
Found ..................................................... 57.83%      4.46%
                                                              14.37% Cl   11.43%

60 gms. of 6 - methoxy - 8 - (alpha - chloracetamido)-quinoline and 100 cc. (1.5 molecular excess) of dibutylamine were refluxed in a suitable container with 400 cc. of propyl alcohol for 16 hours. Vacuum evaporation of the reaction solution to a small volume and dilution of the concentrate with ten volumes of ether, gave a precipitate of 35 gms. of hydrochloride. The ether was then evaporated and the oily residue distilled in vacuo. The yield of the oily 6-methoxy-8-(alpha-butylaminoacetamido)-quinoline having a boiling point of 290 to 295° at 35 mm. pressure, amounted to 45 gms.

Analysis

Calculated for: C$_{20}$H$_{29}$N$_3$O$_2$ ............... 70.0% C    8.46% H
Found ..................................................... 70.3        8.51

EXAMPLE II

*Preparation of 6-methoxy-8-(alpha-diethyl-aminoacetamido)-quinoline*

45 gms. of 6-methoxy-8-(alpha-chloracetamido)-quinoline (23.5 gms. or a 2 mol ratio) of diethylamine were refluxed with 300 cc. of propyl alcohol for 16 hours. The reaction solution was concentrated under vacuum to a small volume and then diluted with 10 volumes of ether to give a precipitate of diethylamine hydrochloride which was filtered off. After evaporating the ether from the filtrate, an oily residue remained which was distilled under vacuo. The yield of 6-methoxy-8 - (alpha - diethylaminoacetamido) - quinoline which boils at 260 to 263° at 35 mm. amounted to 50 gms.

*Analysis*

Calculated for: $C_{16}H_{21}N_3O_2$ —— 67.0% C  7.32% H
Found —— 66.82%  7.56%

EXAMPLE III

*Preparation of 6-methoxy-8-(alpha-diisopropyl-aminoacetamido)-quinoline*

45 gms. of 6-methoxy-8-(alpha-chloracetamido)-quinoline and 52 cc. (38 gms.) of diisopropylamine were refluxed in 300 cc. propyl alcohol for a period of about sixteen hours. Vacuum evaporation of the reaction solution to a small volume and dilution of the concentrate with ten volumes of ether gave a precipitate of diisopropylamine hydrochloride which was filtered off. The ether was then evaporated from the filtrate and the oily residue thus obtained distilled in vacuo. The yield of the oily 6-methoxy-8-(alpha-diisopropylaminoacetamido)-quinoline having a boiling point of 265 to 268° at 35 mm. amounted to 40 gms.

*Analysis*

Calculated for: $C_{18}H_{25}N_3O_2$ —— 68.55% C  7.95% H
Found —— 68.45%  7.99%

EXAMPLE IV

*Preparation of 6-methoxy-8-(alpha-di-n-propyl-aminoacetamido)-quinoline*

45 gms. of 6-methoxy-8-(alpha-chloracetamido)-quinoline were refluxed in 300 cc. of propyl alcohol with 52 cc. (38 gms.) of di-n-propylamine for about sixteen hours. The reaction solution was concentrated to a small volume under vacuum and then was diluted with ten volumes of ether to precipitate out di-n-propylamine hydrochloride. An oily residue was secured upon evaporating off the solvent from the filtrate. The oily residue was distilled under vacuum to give 50 gms. of oily 6-methoxy-8-(alpha-di-n-propylaminoacetamido)-quinoline having a boiling point of 236 to 237° at 35 mm.

*Analysis*

Calculated for: $C_{18}H_{25}N_3O_2$ —— 68.55% C  7.95% H
Found —— 68.28%  8.21%

EXAMPLE V

*Preparation of 6-methoxy-8-(alpha-diisobutyl-aminoacetamido)-quinoline*

45 gms. of 6-methoxy-8-(alpha-chloracetamido)-quinoline were refluxed with 62.5 cc. (46.5 gms.) of diisobutylamine and about 300 cc. of propyl alcohol for a period of about sixteen hours. The reaction solution was concentrated under vacuum and the concentrate diluted with ten volumes of ether to precipitate out diisobutylamine hydrochloride which was filtered off. After evaporating the ether and the solvent from the filtrate, an oily residue remained which was distilled under vacuo. The yield of 6-methoxy-8-(alpha - diisobutylaminoacetamido) - quinoline boiling at 279 to 283° at 35 mm., weighed 52 gms.

*Analysis*

Calculated for: $C_{20}H_{29}N_3O_2$ —— 70.0% C  8.40% H
Found —— 70.31%  8.80%

EXAMPLE VI

*Preparation of 6-methoxy-8-(alpha-di-n-amyl-aminoacetamido)-quinoline*

45 gms. of 6-methoxy-8-(alpha-chloracetamido)-quinoline and 60 cc. (57 gms.) of di-n-amylamine were refluxed with about 300 cc. of propyl alcohol for about sixteen hours. The reaction solution was concentrated under vacuum to a small volume and then diluted with ten volumes of ether to precipitate out di-n-amylamine hydrochloride. The solvent was evaporated from the filtrate and the thus obtained oily residue was distilled under vacuo to give 51 gms. of 6-methoxy-8-(alpha-di-n-amylaminoacetamido)-quinoline having a boiling point of 308 to 310° C. at 33 mm.

*Analysis*

Calculated for: $C_{22}H_{33}N_3O_2$ —— 73.95% C  8.90% H
Found —— 74.11  9.16

EXAMPLE VII

*Preparation of 6-methoxy-8-(alpha-piperidyl-acetamido)-quinoline*

100 cc. of piperidine and 45 gms. of 6-methoxy-8-(alpha - chloracetamido)-quinoline were refluxed with about 300 cc. of propyl alcohol for about sixteen hours. After removing piperidine hydrochloride by the ether treatment described in the examples, and after driving off the solvent from the ethereal filtrate under vacuum, an oily residue was obtained. Upon vacuum distillation, 60 gms. of 6-methoxy-8-(alpha-piperidylacetamido)-quinoline, boiling point 273 to 276° at 35 mm., was secured.

*Analysis*

Calculated for: $C_{17}H_{21}N_3O_2$ —— 68.25% C  7.03% H
Found —— 68.53%  7.30%

By procedures analogous to those described in the above examples using the appropriate alkoxy - (alpha - halogenoacetamido) quinoline and the appropriate secondary amine, the following substituted quinolines representative of those visualized in this invention may be prepared:

(1) 5 - methoxy-8-(alpha-diethylaminoacetamido)-quinoline.
(2) 6-ethoxy - 8 - (alpha-diethylaminoacetamido)-quinoline.
(3) 4 - methoxy-8-(alpha-diethylaminoacetamido)-quinoline.
(4) 3- methoxy-8-(alpha-diethylaminoacetamido)-quinoline.
(5) 2 - methoxy-8-(alpha-diethylaminoacetamido)-quinoline.
(6) 7 - methoxy-8-(alpha-diethylaminoacetamido)-quinoline.
(7) 6 - propoxy-8-(alpha-diethylaminoacetamido)-quinoline.
(8) 6-butoxy - 8 - (alpha-diethylaminoacetamido)-quinoline.
(9) 6-methoxy - 7 - (alpha-diethylaminoacetamido)-quinoline.
(10) 6 - methoxy - 5 - (alpha-diethylaminoacetamido)-quinoline.
(11) 6 - methoxy-4-(alpha-diethylaminoacetamido)-quinoline.

(12) 6 - methoxy-3-(alpha-diethylaminoacetamido)-quinoline.
(13) 6 - methoxy-2-(alpha-diethylaminoacetamido)-quinoline.
(14) 5 - methoxy-6-(alpha-diethylaminoacetamido)-quinoline.
(15) 5 - methoxy-2-(alpha-diethylaminoacetamido)-quinoline.
(16) 6-ethoxy - 8 - (alpha-diisopropylaminoacetamido)-quinoline.
(17) 6-ethoxy - 8 - (alpha-di-n-propylaminoacetamido)-quinoline.
(18) 6-ethoxy - 8 - (alpha-diisobutylaminoacetamido)-quinoline.
(19) 6-ethoxy - 8 - (alpha-di-n-amylaminoacetamido)-quinoline.
(20) 6 - ethoxy-8-(alpha-piperidylacetamido)-quinoline.
(21) 4 - methoxy-8-(alpha-diisopropylaminoacetamido)-quinoline.
(22) 3-methoxy - 8 - (alpha-diisopropylaminoacetamido)-quinoline.
(23) 4 - methoxy-8-(alpha-di-n-propylaminoacetamido)-quinoline.
(24) 4 - methoxy-8-(alpha-diisobutylaminoacetamido)-quinoline.
(25) 4-methoxy - 8 - (alpha-di-n-amylaminoacetamido)-quinoline.
(26) 4 - methoxy - 8 - (alpha-piperidylacetamido)-quinoline.
(27) 3 - methoxy-8-(alpha-di-n-propylaminoacetamido)-quinoline.
(28) 3-methoxy - 8 - (alpha-diisobutylaminoacetamido)-quinoline.
(29) 3-ethoxy - 8 - (alpha-diisobutylaminoacetamido)-quinoline.
(30) 3-methoxy - 8 - (alpha-diisobutylaminoacetamido)-quinoline.
(31) 3-methoxy - 8 - (alpha-di-n-amylaminoacetamido)-quinoline.
(32) 3 - methoxy - 8 - (alpha-piperidylacetamido)-quinoline.
(33) 2 - methoxy - 8 - (alpha-diisopropylaminoacetamido)-quinoline.
(34) 2 - methoxy - 8 - (alpha-di-n-propylaminoacetamido)-quinoline.
(35) 2-ethoxy - 8 - (alpha-diisobutylaminoacetamido)-quinoline.
(36) 2-methoxy - 8 - (alpha-di-n-amylaminoacetamido)-quinoline.
(37) 2-methoxy - 8 - (alpha-piperidylacetamido)-quinoline.
(38) 7-methoxy - 8 - (alpha-diisopropylaminoacetamido)-quinoline.
(39) 7 - methoxy - 8 - (alpha-di-n-propylaminoacetamido)-quinoline.
(40) 7-methoxy - 8 - (alpha-diisobutylaminoacetamido)-quinoline.
(41) 7-methoxy - 8 - (alpha-di-n-amylaminoacetamido)-quinoline.
(42) 7 - ethoxy - 8 - (alpha-piperidylacetamido)-quinoline.
(43) 6-propoxy - 8 - (alpha-diisopropylaminoacetamido)-quinoline.
(44) 6-propoxy - 8 - (alpha-diisobutylaminoacetamido)-quinoline.
(45) 6 - propoxy - 8 - (alpha-piperidylacetamido)-quinoline.
(46) 6-butoxy - 8 - (alpha-diisopropylaminoacetamido)-quinoline.
(47) 6 - butoxy - 8 - (alpha-diisobutylaminoacetamido)-quinoline.
(48) 6-butoxy - 8 - (alpha-di-n-amylaminoacetamido)-quinoline.
(49) 6 - butoxy - 8 - (alpha - piperidylacetamido)-quinoline.
(50) 6-methoxy - 7 - (alpha-diisopropylaminoacetamido)-quinoline.
(51) 6-methoxy - 5 - (alpha-diisopropylaminoacetamido)-quinoline.
(52) 6 - methoxy-4-(alpha-diisopropylaminoacetamido)-quinoline.
(53) 6 - ethoxy - 7 - (alpha - piperidylacetamido)-quinoline.
(54) 6 - ethoxy - 5 - (alpha - piperidylacetamido)-quinoline.
(55) 6-methoxy - 4 - (alpha-diisopropylaminoacetamido)-quinoline.
(56) 6 - methoxy-3-(alpha-diisopropylaminoacetamido)-quinoline.
(57) 6-methoxy - 2 - (alpha-diisopropylaminoacetamido)-quinoline.
(58) 5 - methoxy - 6 - (alpha - diisopropylaminoacetamido)-quinoline.
(59) 6 - ethoxy - 3 - (alpha - piperidylacetamido)-quinoline.
(60) 6 - methoxy - 2 - (alpha - piperidylacetamido)-quinoline.
(61) 5 - ethoxy - 6 - (alpha-piperidylacetamido)-quinoline.
(62) 6 - ethoxy - 8 - (alpha - dicyclohexylaminoacetamido)-quinoline.
(63) 5 - methoxy - 6 - (alpha - dicyclopentylaminoacetamido)-quinoline.
(64) 6 - methoxy - 8 - (alpha-ethyl propyl aminoacetamido)-quinoline.
(65) 6 - methoxy - 8 - (alpha-ethyl-n-butyl aminoacetamido)-quinoline.
(66) 6 - methoxy-8-(alpha-n-propyl-n-butyl-aminoacetamido)-quinoline.
(67) 6 - methoxy - 8 - (alpha-ethyl isopropyl aminoacetamido)-quinoline.
(68) 6 - methoxy - 8 - (alpha-ethyl isobutyl aminoacetamido)-quinoline.
(69) 6-methoxy - 8 - (alpha isopropyl isobutyl-aminocetamido)-quinoline.
(70) 6-methoxy - 8 - (alpha ethyl-n-amylaminoacetamido)-quinoline.
(71) 6-methoxy - 8 - (alpha ethyl allyl aminoacetamido)-quinoline.
(72) 6 - methoxy-8-(alpha ethyl vinyl-aminoacetamido)-quinoline.
(73) 6 - methoxy-8-(alpha ethyl cyclopentyl aminoacetamido)-quinoline.
(74) 6-ethoxy - 8 - (alpha ethyl propyl aminoacetamido)-quinoline.
(75) 6-ethoxy-8-(alpha ethyl-n-butyl aminoacetamido)-quinoline.
(76) 6-ethoxy - 8 - (alpha-n-propyl-n-butyl-aminoacetamido)-quinoline.
(77) 6 - ethoxy - 8 - (alpha-ethyl-isopropyl-aminoacetamido)-quinoline.
(78) 6 - ethoxy - 8 - (alpha-ethyl-isobutyl-aminoacetamido)-quinoline.
(79) 6-ethoxy - 8 - (alpha-isopropyl-isobutyl-aminoacetamido)-quinoline.
(80) 6 - ethoxy - 8 - (alpha-ethyl-n-amyl-aminoacetamido)-quinoline.
(81) 6-ethoxy - 8 - (alpha-ethyl-allyl-aminoacetamido)-quinoline.
(82) 6-ethoxy - 8 - (alpha-ethyl-vinyl-aminoacetamido)-quinoline.
(83) 6-ethoxy - 8 - (alpha-ethyl-cyclopentyl-aminoacetamido)-quinoline.

I claim:
6-methoxy - 8 - alpha-ethyl-n-amyl-amino-acetamido)-quinoline.

WILLIAM F. BRUCE.

REFERENCES CITED

The following references are of record in the file of this patent:

UNITED STATES PATENTS

| Number | Name | Date |
|---|---|---|
| 2,326,497 | Riester et al. | Aug. 10, 1943 |
| 2,424,063 | Shonle et al. | July 15, 1947 |

FOREIGN PATENTS

| Number | Country | Date |
|---|---|---|
| 65,110 | Germany | Oct. 17, 1892 |

OTHER REFERENCES

Williams, "Chemotherapy of Malaria" (Published by Lederle Laboratories, N. Y., June 1941), pp. 81–88 and 141–143.

Wiselogle, "Survey of Antimalarial Drugs, 1941–1945," vol. II, page 1226 (J. W. Edwards, Ann Arbor, Mich, 1946).

Certificate of Correction

Patent No. 2,494,083　　　　　　　　　　　　　　　　　　　January 10, 1950

WILLIAM F. BRUCE

It is hereby certified that errors appear in the printed specification of the above numbered patent requiring correction as follows:

Column 2, line 43, in the formula, for "$C_{29}$" read $C_{20}$; column 3, line 8, after "35 mm." insert a comma; column 4, lines 20 and 21, for "33 mm." read *35 mm.*; line 47, after "halogenoacetamido)" and before "quinoline" insert a hyphen; column 7, line 2, before "alpha" insert an opening parenthesis;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*